(12) United States Patent
Sutterfield et al.

(10) Patent No.: US 8,321,926 B1
(45) Date of Patent: Nov. 27, 2012

(54) SYSTEM AND METHOD OF PROTECTING A SYSTEM THAT INCLUDES UNPROTECTED COMPUTER DEVICES

(75) Inventors: Brian D. Sutterfield, Apple Valley, MN (US); Bradley T. Atwater, Medford, NJ (US)

(73) Assignee: Lockheed Martin Corporation, Bethesda, MD (US)

( * ) Notice: Subject to any disclaimer, the term of this patent is extended or adjusted under 35 U.S.C. 154(b) by 1029 days.

(21) Appl. No.: 12/326,246

(22) Filed: Dec. 2, 2008

(51) Int. Cl.
*G06F 9/00* (2006.01)
*G06F 15/16* (2006.01)
*G06F 12/14* (2006.01)
*G06F 7/04* (2006.01)
*G06F 17/30* (2006.01)
*G06F 1/26* (2006.01)
*G06F 11/30* (2006.01)
*G06F 3/00* (2006.01)
*G06F 13/28* (2006.01)
*H04N 7/16* (2011.01)
*G08B 13/00* (2006.01)
*G08B 21/00* (2006.01)
*G08B 29/00* (2006.01)

(52) U.S. Cl. ............... 726/11; 726/26; 726/34; 710/8; 710/36; 711/152; 713/189

(58) Field of Classification Search ............... 726/11, 726/34
See application file for complete search history.

(56) References Cited

U.S. PATENT DOCUMENTS

| | | | | |
|---|---|---|---|---|
| 5,712,973 A * | 1/1998 | Dayan et al. | | 726/36 |
| 5,828,893 A * | 10/1998 | Wied et al. | | 709/229 |
| 5,841,869 A * | 11/1998 | Merkling et al. | | 713/164 |
| 5,864,683 A * | 1/1999 | Boebert et al. | | 709/249 |
| 5,995,628 A * | 11/1999 | Kitaj et al. | | 713/164 |
| 6,009,527 A * | 12/1999 | Traw et al. | | 726/15 |
| 6,067,620 A * | 5/2000 | Holden et al. | | 713/155 |
| 6,272,533 B1 * | 8/2001 | Browne | | 709/213 |
| 6,311,273 B1 * | 10/2001 | Helbig et al. | | 726/2 |
| 6,622,184 B1 * | 9/2003 | Tabe et al. | | 710/36 |
| 6,865,672 B1 * | 3/2005 | Carmeli | | 713/155 |
| 7,028,335 B1 * | 4/2006 | Borella et al. | | 726/11 |
| 7,149,796 B2 * | 12/2006 | McDaniel-Sanders et al. | | 709/223 |
| 7,305,704 B2 * | 12/2007 | Ofek et al. | | 726/15 |
| 7,437,752 B2 * | 10/2008 | Heard et al. | | 726/1 |
| 7,444,667 B2 * | 10/2008 | Bulusu et al. | | 726/1 |
| 7,487,367 B2 * | 2/2009 | Belnet et al. | | 713/194 |
| 7,620,984 B2 * | 11/2009 | Kallahalla et al. | | 726/22 |
| 7,661,105 B2 * | 2/2010 | Watt et al. | | 718/100 |
| 7,886,349 B2 * | 2/2011 | Taglienti et al. | | 726/11 |
| 7,979,658 B2 * | 7/2011 | Obereiner et al. | | 711/164 |

(Continued)

OTHER PUBLICATIONS

Xu, Mingdi et al., "A New Data Protecting Scheme Based on TPM," Either ACIS International Conference in Software Engineering, Artificial Intelligence, Networking, and Parallel/ Distributed Computing, IEEE, 2007.*

(Continued)

*Primary Examiner* — Carolyn B Kosowski
(74) *Attorney, Agent, or Firm* — Hamre, Schumann, Mueller & Larson, P.C.

(57) ABSTRACT

A system and method to selectively isolate one or more unprotected computer devices from the rest of the computer system and/or from the network. The ability to isolate and/or authenticate the software and/or hardware on or interacting with the unprotected software and/or hardware provides for a secured system despite the presence or use of an unprotected computer device.

17 Claims, 8 Drawing Sheets

U.S. PATENT DOCUMENTS

| | | | | |
|---|---|---|---|---|
| 8,082,585 | B1* | 12/2011 | Givonetti | 726/22 |
| 8,086,844 | B2* | 12/2011 | Buer et al. | 713/151 |
| 8,103,869 | B2* | 1/2012 | Balandin et al. | 713/160 |
| 2002/0007459 | A1* | 1/2002 | Cassista et al. | 713/200 |
| 2003/0229805 | A1* | 12/2003 | Perry | 713/200 |
| 2004/0061714 | A1* | 4/2004 | Sinclair et al. | 345/705 |
| 2004/0162992 | A1* | 8/2004 | Sami et al. | 713/200 |
| 2004/0250036 | A1* | 12/2004 | Willman et al. | 711/163 |
| 2005/0015615 | A1* | 1/2005 | Gonsalves et al. | 713/200 |
| 2005/0028000 | A1* | 2/2005 | Bulusu et al. | 713/200 |
| 2005/0144468 | A1* | 6/2005 | Northcutt et al. | 713/189 |
| 2006/0026419 | A1* | 2/2006 | Arndt et al. | 713/150 |
| 2006/0026422 | A1* | 2/2006 | Bade et al. | 713/164 |
| 2006/0090211 | A1* | 4/2006 | Stidl et al. | 726/34 |
| 2006/0136717 | A1* | 6/2006 | Buer et al. | 713/155 |
| 2006/0282887 | A1* | 12/2006 | Trumper et al. | 726/11 |
| 2007/0011462 | A1* | 1/2007 | Lee | 713/183 |
| 2007/0074046 | A1* | 3/2007 | Czajkowski et al. | 713/190 |
| 2007/0106910 | A1* | 5/2007 | Mizuno | 713/189 |
| 2007/0162956 | A1* | 7/2007 | Tucker et al. | 726/2 |
| 2007/0266447 | A1* | 11/2007 | Hollander | 726/34 |
| 2007/0300305 | A1* | 12/2007 | Gonsalves et al. | 726/26 |
| 2008/0016349 | A1* | 1/2008 | Kahn | 713/168 |
| 2008/0040786 | A1* | 2/2008 | Chang | 726/10 |
| 2009/0144466 | A1* | 6/2009 | Takayama et al. | 710/38 |
| 2009/0252029 | A1* | 10/2009 | Daetz et al. | 370/216 |
| 2009/0328145 | A1* | 12/2009 | Berger et al. | 726/3 |
| 2009/0328164 | A1* | 12/2009 | Sunder et al. | 726/5 |
| 2010/0011427 | A1* | 1/2010 | Zayas | 726/7 |
| 2010/0037311 | A1* | 2/2010 | He et al. | 726/15 |
| 2010/0042823 | A1* | 2/2010 | Arndt et al. | 713/2 |
| 2010/0077471 | A1* | 3/2010 | Schleiss et al. | 726/13 |
| 2010/0083349 | A1* | 4/2010 | Xiao et al. | 726/1 |
| 2010/0146089 | A1* | 6/2010 | Freimuth et al. | 709/222 |
| 2010/0153592 | A1* | 6/2010 | Freimuth et al. | 710/38 |
| 2011/0289580 | A1* | 11/2011 | Onuma | 726/12 |
| 2012/0159651 | A1* | 6/2012 | Beacham | 726/34 |

OTHER PUBLICATIONS

Suh et al. "AEGIS: A single-chip secure processor." Information Security Technical Report, vol. 10, 1005, pp. 63-73.

* cited by examiner

SYSTEM AND METHOD OF PROTECTING A SYSTEM THAT INCLUDES UNPROTECTED COMPUTER DEVICES

FIELD

The system and method relates generally to protecting a computer system that includes unprotected computer hardware and/or software.

BACKGROUND

As computing devices become connected to various systems and networks, securing and protecting computer devices from attacks has become important to those who have sensitive information on the computing devices or systems. Computer systems can be attacked by software based attacks, hardware based attacks, or a combination thereof. When software is primarily used to attack a computer device or system, it is generally referred to as "software hacking." When hardware is used or if a physical manipulation of the hardware is performed to attack the computer system, it is generally referred as "hardware hacking." More sophisticated attacks may involve both "software hacking" and "hardware hacking" of a system. When hardware attacks are made to a computer system and/or network, a computing device or module may be used to connect to the system and/or network. Such computing device or module is generally referred as "rogue hardware."

These advancements in the devices and methods of attacks have created challenges to detect and secure the vulnerabilities of modern computer systems and networks. Securing a computer system and/or network may include protection of data from unauthorized copying, transferring, accessing, modifying, and/or deleting of data. Securing a computer system and/or network may include hardware based configurations wherein certain types of software are prevented from running on the hardware. Securing a computer system and/or network may also include prevention of other forms of unauthorized activities on the system and/or network. Generally, computer security provides constraints on the hardware and/or software in a system to make the hardware and/or software perform the way it is configured to perform. Using these constraints may help detect and prevent system vulnerability from rogue hardware. One method of providing such a security is trusted computing.

In theory, trusted computing provides that a computer system will act in specific and desired ways. The computer system's behavior is enforced by hardware, software, or both. Such enforcement may be achieved by using unique "keys" or identifications of hardware, software, or both.

A Trusted Computing Module (TCM) is one example of providing specialized hardware. Specialized hardware can be custom-built to provide hardware based computer security. Examples of specialized hardware include devices that incorporate a secure processor. For example, the AEGIS is a single-chip secure processor that may be used in a TCM (see Suh et al., AEGIS: A single-chip secure processor, Information Security Technical Report (2005) 10, 63-73). However, in a computing system, using only one type of a TCM can lead to undesired vulnerability if that TCM is "broken." The term "broken" or "breaking" generally refers to overcoming a computer's security. When a particular TCM has been successfully broken, the attacker would then have the ability to potentially break other systems or devices that rely on the same type of TCM for security. Accordingly, if a system includes a TCM or a Secure Processor, it is generally not advertised that the system includes such a component. Generally this is because the knowledge that a system includes a TCM, or a specialized hardware such as a Secure Processor, gives a hacker additional information that could help to attack a security measure. Different TCMs may be used within larger systems to provide an extra layer of security from this form of vulnerability. Using multiple TCMs has a disadvantage in that the system can become extremely complex and costly. To provide sufficient layers of protection, each computing module on a computer system would require multiple TCMs each specifically designed. The cost of producing so many individually developed TCMs may not make sense if, for example, the computing system is designed to be abandoned or to be disposable. Examples of systems that are designed to be abandoned or to be disposable are missiles, drones, other military hardware/systems, and space exploration devices.

All of the above devices, systems, and methods have various disadvantages. Accordingly, improved devices, systems and methods for protecting a computer system that includes unprotected computer hardware and/or software are desirable.

SUMMARY

Embodiments disclosed herein relate to a system and a method for protecting a computer system.

An embodiment of the computer system includes a back panel. The back panel includes a first logical node, a second logical node, a back panel network that connects the first logical node to the second logical node for communication, a first switch configured to the back panel network, and an I/O controller that controls the switch. The first switch includes a blocked state and an unblocked state. The embodiment further includes a first computer device connected to the first logical node, a second computer device connected to the second logical node, and a network interface unit (NIU) connected to the first computer device. A second NIU may also be connected to the second computer device. The embodiment may further include a trusted computing module (TCM) that controls the I/O controller.

Further, the NIU of the embodied computer system may include an I/O component for receiving and sending data, an authenticator component that determines authentication, an encrypting/decrypting component, and a security component that includes a shared key. The NIU may be configured such that the computer device sends and the NIU receives authentication information, an authentication response, or both. The NIU may also be configured such that the NIU sends and the computer device receives authentication queries, and may also be configured such that the NIU sends and the computer device receives authentication results. The NIU may be configured to have additional functions.

The computer device may be an unprotected computer device.

The back panel network may include a high speed interconnect connection, a discrete I/O connection, an Ethernet connection, and a power connection that delivers power to the logical node. A switch for each of the connections of the back panel network may also be included. Each of the switches may be controlled by the I/O controller for selectively blocking and/or unblocking each of the connections.

The back panel may be configured to be in at least two portions. The first portion is configured to be a protected back panel portion and the second portion is configured to be a non-protected back panel portion. In an embodiment, the I/O controller is in the protected back panel portion.

In an embodiment, the computer system is connected to a trusted network, the first computer device is not in direct communication with the trusted network, and the first computer device is configured to send data to the trusted network via the NIU and receive data from the trusted network via the NIU.

In another embodiment, the computer system includes a back panel having a plurality of logical nodes, a back panel network that connects at least one of the plurality of logical nodes to another logical node for communication, a plurality of switches configured to the back panel network, wherein each switch includes a blocked state and an unblocked state, and an I/O controller that controls the plurality of switches. The computer system also includes a plurality of computer devices, wherein at least one computer device is connected to at least one logical node. The system further includes a plurality of network interface units (NIUs), wherein at least one of the plurality of NIUs is connected to at least one of the plurality of computer devices, and wherein at least one of the plurality of NIUs is connected to a trusted network. The system may further include a trusted computing module (TCM) that controls the I/O controller. Each of the plurality of NIUs may include an I/O component for receiving and sending data, an authenticator component that determines authentication, an encrypting/decrypting component, and a security component that includes a shared key. Further, at least one of the plurality of computer devices may be configured to send and at least one of the plurality of NIUs may be configured to receive authentication information. Further, at least one of the plurality of computer devices may be configured to send and at least one of the plurality of NIUs may be configured to receive authentication response. Further, at least one of the plurality of NIUs may be configured to send and at least one of the plurality of computer devices may be configured to receive authentication queries. Further, at least one of the plurality of NIUs may be configured to send and at least one of the plurality of computer devices may be configured to receive authentication results. One or more of the plurality of computer devices may be an unprotected computer device.

The back panel network may include a high speed interconnect connection that connects to at least two of the plurality of the logical nodes, a discrete I/O connection that connects to at least two of the plurality of the logical nodes, an Ethernet connection that connects to at least two of the plurality of the logical nodes, and a power connection that delivers power to at least two of the plurality of logical nodes.

An embodied method includes using the computer system disclosed herein, where sending data to a trusted network from the computer device comprises using the NIU. The method may also include, where receiving data from the trusted network to the computer device comprises using the NIU. In other embodiments, sending data to a trusted network from the computer device consists of using the NIU. In other embodiments, receiving data from the trusted network to the computer device consists of using the NIU.

An embodied method for protecting a computer system that is to be connected to a trusted network includes configuring a back panel includes a first logical node, a second logical node, an I/O controller, and a back panel network that includes a first switch; configuring the I/O controller to control the first switch; configuring the back panel network to be in communication with the first logical node and the second logical node; configuring a computer device to be in communication with the first logical node; and configuring a network interface unit (NIU) to be in communication with the computer device. The method may also include configuring a trusted computer module (TCM) to be in communication with the I/O controller. The method may also include configuring the TCM and the NIU to be in communication with the trusted network.

An embodied method includes the TCM and the NIU that are connected to the trusted network, and selectively isolating the first logical node from the trusted network, wherein selectively isolating the first logical node includes sending a signal to the TCM from the trusted network for blocking the first switch, sending a signal from the TCM to the I/O controller for blocking the first switch, and sending a signal from the I/O controller to the first switch that blocks the first switch.

An embodied method includes sending data to the trusted network from at least one of the plurality of computer devices using at least one of the plurality of NIUs, and receiving data from the trusted network to at least one of the plurality of computer devices consists of using at least one of the plurality of NIUs.

An embodied method for protecting a computer system may further include selectively isolating one or more logical nodes from the trusted network. Selectively isolating a logical node includes sending a signal to the TCM for controlling the I/O controller, sending a signal from the TCM to the I/O controller to block a switch, sending a signal from the I/O controller to the switch, and blocking the switch. The I/O controller may send multiple signals to multiple switches to place the multiple switches to a blocked state or an unblocked state. When a switch is in the blocked state, the logical node is isolated from the rest of the system using that blocked connection. For example, in an embodiment that includes a back panel network that has a high speed interconnect connection that connects to at least one logical node, a discrete I/O connection that connects to at least one logical node, an Ethernet connection that connects to at least one logical node, and a power connection that delivers power to the logical node, each connection may have a switch. Accordingly, the switch associated with each connection may be controlled by the I/O controller to be in a blocked state or an unblocked state. Thus, if the I/O controller controls a switch configured on the power connection such that the switch is in the blocked state, the logical node connected to the power connection would not receive any power, causing the particular logical node to be selectively isolated on the power connection from the rest of the system. Similarly, for example, if the I/O controller controls the switches associated with the high speed interconnect connection, the discrete I/O connection, the Ethernet connection, and the power connection, that are connected to a particular logical node to all be in blocked states, that logical node becomes selectively isolated on all of the connections from the rest of the system.

A switch for each of the connections of the back panel network for isolating each of the plurality of logical nodes may also be provided. Each of the switches may be controlled by the I/O controller for selectively blocking and/or unblocking each of the connections. Selective isolating of nodes may isolate all of the logical nodes, none of the logical nodes, or selectively isolate specific logical nodes according to a particular need or preference.

DETAILED DESCRIPTION

The term "computer device" is defined herein to include a computer module. Examples of computer modules include commercial off-the-shelf (COTS) components. COTS components are, for example, commercial software or hardware that are generally available and are not specially developed in-house or on a per project basis. A computer device includes unprotected computer devices. Generally, most COTS computer devices are unprotected computer devices. Even if a computer device has some form of computer security method, if the computer device has been broken or hacked, then such a computer device is also defined herein to be an unprotected computer device. Further, even if the computer device has a sophisticated computer security measure, the fact that it is commercially and publicly available means that there may be someone who has the ability to break or has already broken the computer security measure. Accordingly, even unbroken computer devices, if they are COTS, may be considered to be unprotected computer device. Computer devices that have been specially developed to have security measures, if those security measures have been broken, may also be considered unprotected computer devices.

The term "information" is defined to include analog signals and digital signals that carry data for computing devices A logical node includes connection points of physical hardware. A logical node may also be a wireless connection.

The term "authentication" is defined herein to include software authentication, hardware authentication, and a combination thereof. One skilled in the art would also understand other forms of authentication as related to computer devices and systems.

The back panel may be referred to in a logical reference or a physical reference. In the logical reference, the switch is a part of the back panel. In the physical reference, the back panel and the switch may be distinct physical entities or structures. A back panel uses the services of one or more switches which may be Fibre Channel, Ethernet or some other optical or electrical switch. Accordingly, a back panel may include an automated switch. For example, the back panel may include a QLogic Fibre Channel switch, an Ethernet switch, or an optical switch. The back panel may also include more than one type of a switch.

A system is two or more devices connected to be in communication with each other. A network is two or more devices, systems, or combinations thereof connected to be in communication with each other. Connection includes a directly or indirectly wired connection, a wireless connection, or a combination of wired and wireless connections. Wired connections include, but are not limited to, optical connections, copper connections, Ethernet connections, PMC connector I/O, PCI-Express, AGP, Rapid I/O, serial ATA, parallel ATA, and any combination thereof. Wireless connections include, but are not limited to, 3G, Bluetooth, WiFi, radio frequency, microwave frequency, infrared, and any combinations thereof. Communication includes sending and/or receiving information from one device to another. Communication may also include a plurality of information that is sent and/or received by a plurality of devices. Communication may also include a connection configured to deliver of power.

A NIU performs the authentication for the unprotected computer device. In one embodiment, the NIU controls all communication to and from the unprotected computer device to and from the rest of the system external to the unprotected computer device.

Figure 1:
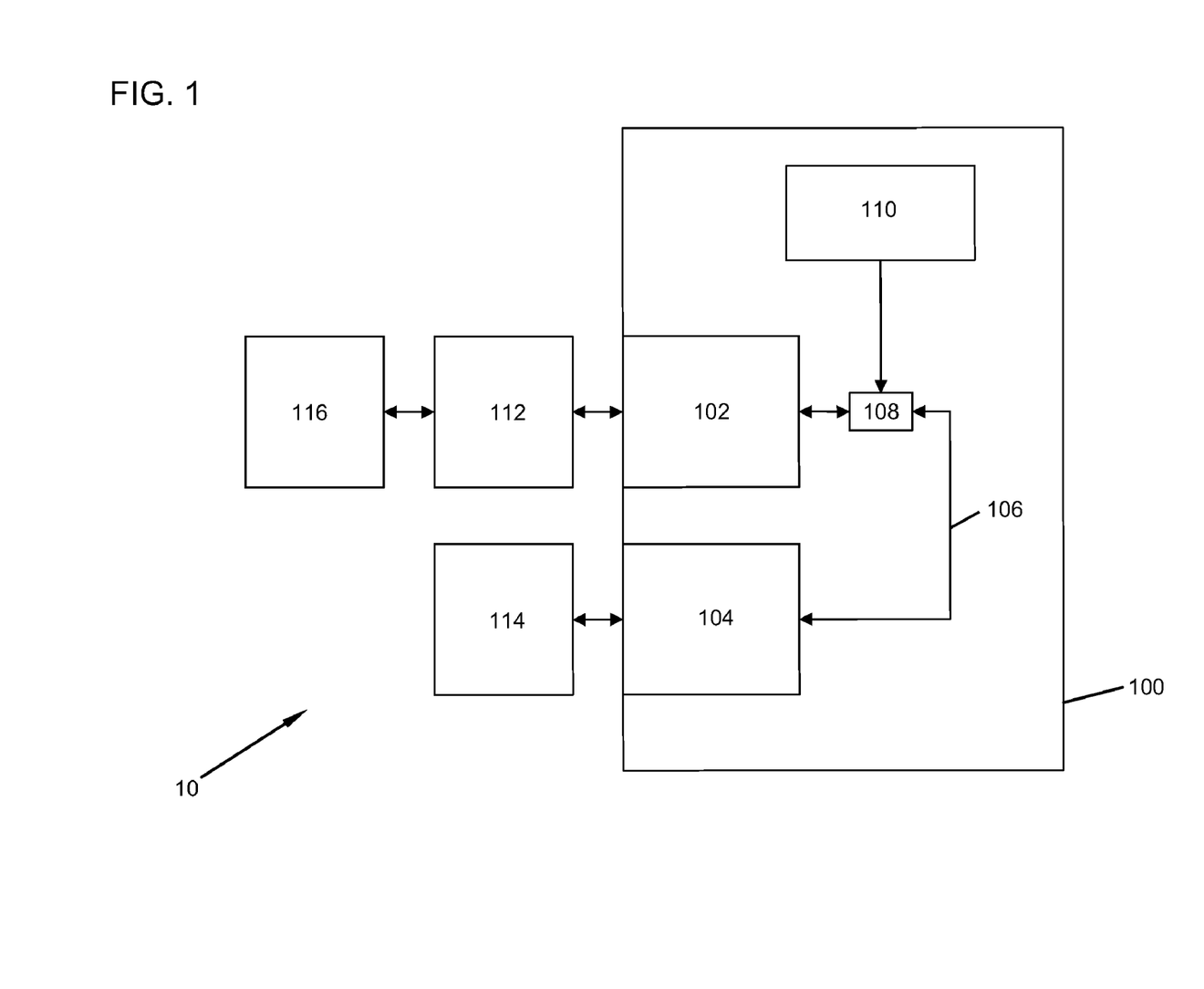
FIG. 1 shows a block diagram of a system according to an embodiment.

FIG. 1 shows a block diagram of a computer system according to one embodiment. The computer system 10 includes a back panel 100. The back panel 100 is shown with a first logical node 102 and a second logical node 104. The back panel 100 includes a back panel network 106 that interconnects the first logical node 102 with the second logical node 104. The back panel network 106 allows for communication between the first logical node 102 and the second logical node 104. The back panel network 106 may also provide power to the first logical node 102 and the second logical node 104. A switch 108 is configured on the back panel network 106. The switch 108 has a blocked state and an unblocked state, wherein the switch 108 may be in one of the two states, exclusively at any one time. In the blocked state, the switch 108 blocks communication to/from the first logical node 102. In the unblocked state, the switch 108 allows communication to/from the first logical node 102. An I/O controller 110 may be built into the back panel 100 as a component. FIG. 1 shows the I/O controller 110 included in the back panel 100, wherein the I/O controller 110 controls the switch 108 to be in the blocked state or the unblocked state.

FIG. 1 also shows a first computer device 112 connected to the first logical node 102, and a second computer device 114 connected to the second logical node 104. The first computer device 112 is connected to a network interface unit (NIU) 116. The computer system 10 is configured to allow communication between the NIU 116 to/from the first computer device 112; and to allow communication between the first computer device 112 and the first logical node 102. The second computer device 114 may communicate with the second logical node 104. When the I/O controller 110 controls the switch 108 to be in the unblocked state, the first computer device 112 may communicate with the second computer device 114 via the first logical node 102, the back panel network 106, and the second logical node 104. When the I/O controller 110 controls the switch 108 to be in the blocked state, the first computer device 112 cannot communicate with the second computer device 114 via the back panel network 106.

Figure 2:
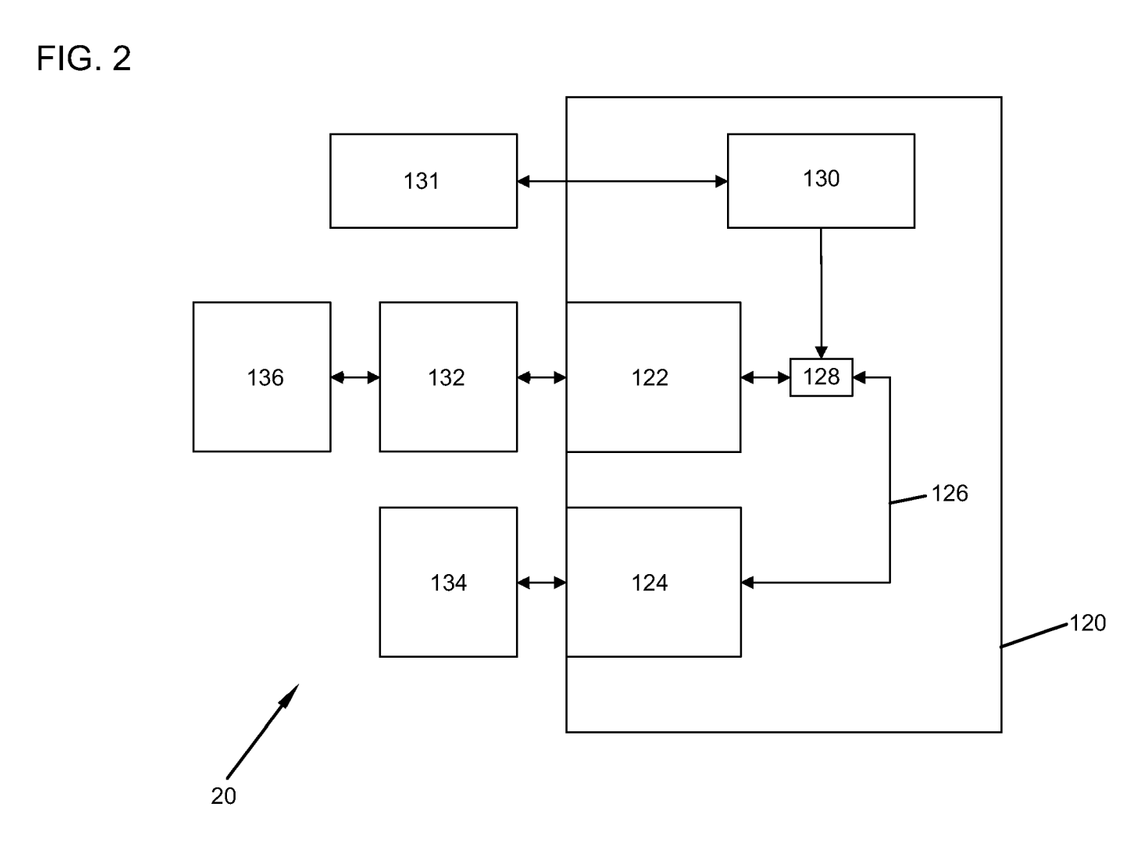
FIG. 2 shows a block diagram of a system according to an embodiment.

FIG. 2 shows another embodiment of a computer system 20 that includes a back panel 120. The back panel 120 is shown with a first logical node 122 and a second logical node 124. The back panel 120 includes a back panel network 126 that interconnects the first logical node 122 with the second logical node 124. The back panel network 126 allows for communication between the first logical node 122 and the second logical node 124. The back panel network 126 may also provide power to the first logical node 122 and the second logical node 124. A switch 128 is configured on the back panel network 126. The switch 128 has a blocked state and an unblocked state, wherein the switch 128 may be in one of the two states, exclusively at any one time. In the blocked state, the switch 128 blocks the communication to/from the first logical node 122. In the unblocked state, the switch 128 allows communication to/from the first logical node 122. An I/O controller 130 is also included in the back panel 120. The I/O controller 130 may be built into the back panel 120 as a component. The I/O controller 130 controls the switch 128 to be in the blocked state or the unblocked state. The I/O controller 130 is controlled by a trusted computing module (TCM) 131 that is external to the back panel 120. Thus, the TCM 131 may control the I/O controller 130 to control the switch 128 by receiving signals external to the computer system 20. FIG. 2 also shows a first computer device 132 connected to the first logical node 122, a second computer device 134 connected to the second logical node 124. The first computer device 132 is connected to a network interface unit (NIU) 136 which may be connected to a network.

Figure 3:
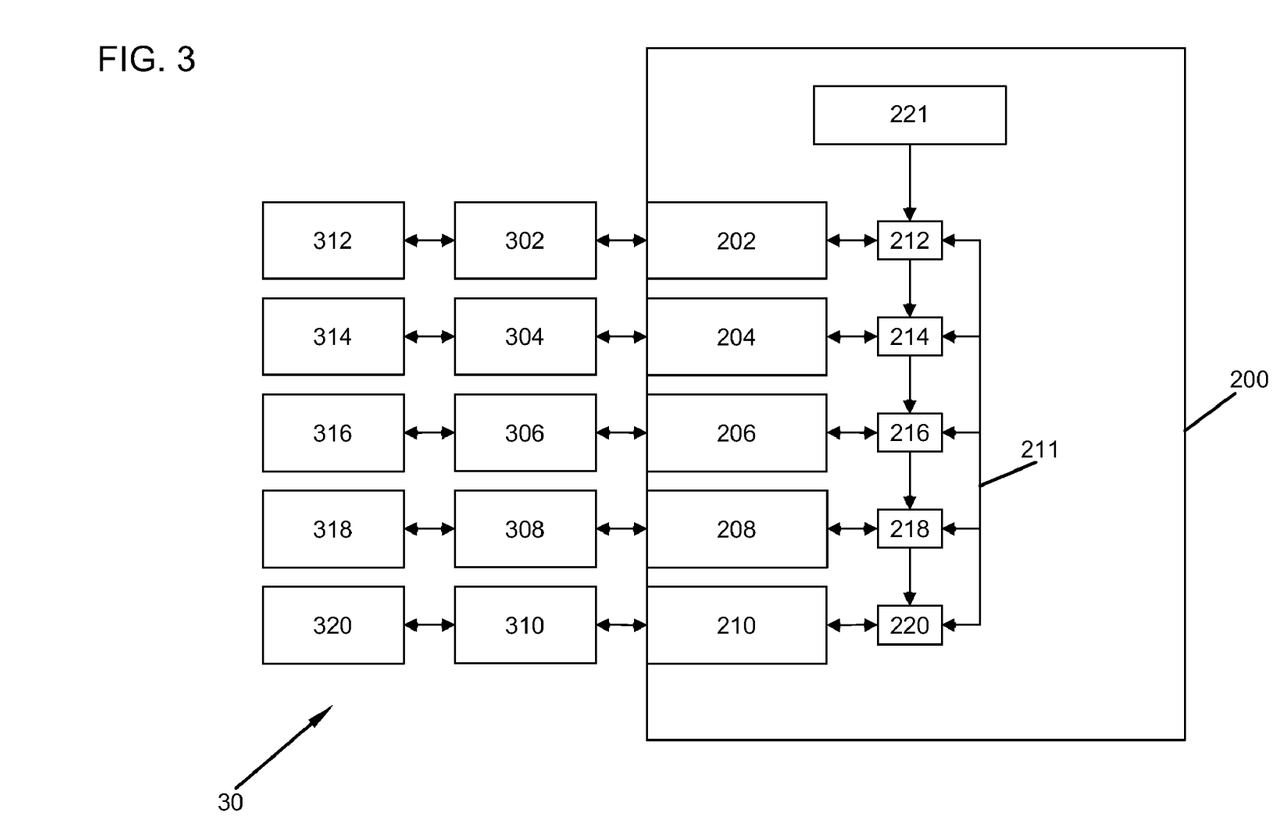
FIG. 3 shows a block diagram of a system according to an embodiment.

FIG. 3 shows another embodiment of a computer system 30 that includes a back panel 200. The back panel 200 has a plurality of logical nodes including a first logical node 202, a second logical node 204, a third logical node 206, a fourth logical node 208, and a fifth logical node 210. Although FIG. 3 shows five logical nodes, it is contemplated that a more or fewer number of logical nodes may be included in the computer system.

The back panel 200 also includes a back panel network 211. Associated with each of the plurality of logical nodes, a plurality of switches is configured on the back panel network 211 including a first switch 212, a second switch 214, a third switch 216, a fourth switch, 218, and a fifth switch 220. Each switch 212, 214, 216, 218, 220 has a blocked state and an unblocked state, wherein each switch 212, 214, 216, 218, 220 may individually be in one of the two states, wherein for each switch, being in a particular state is exclusive at any one time. An I/O controller 221 controls the plurality of switches 212, 214, 216, 218, 220 to selectively and individually be in the blocked state or in the unblocked state.

FIG. 3 shows a configuration of the computer system 30, wherein the switches 212, 214, 216, 218, 220 are configured on the back panel network 211 such that when the first switch 212 is in the blocked state, the first switch 212 blocks communication to/from the first logical node 202. When the first switch 202 is in the unblocked state, communication to/from the first logical node 202 is possible. Further, when the second switch 214 is in the blocked state, the second switch 214 blocks communication to/from the second logical node 204. When the second switch 214 is in the unblocked state, communication to/from the second logical node 204 is possible. Further, when the third switch 216 is in the blocked state, the third switch 216 blocks communication to/from the third logical node 206. When the third switch 216 is in the unblocked state, communication to/from the third logical node 206 is possible. Further, when the fourth switch 218 is in the blocked state, the fourth switch 218 blocks communication to/from the fourth logical node 208. When the fourth switch 218 is in the unblocked state, communication to/from the fourth logical node 208 is possible. Furthermore, when the fifth switch 220 is in the blocked state, the fifth switch 220 blocks communication to/from the fifth logical node 210. When the fifth switch 220 is in the unblocked state, communication to/from the fifth logical node 210 is possible.

The I/O controller 221 may be built into the back panel 200 as a component. The I/O controller 221 controls the plurality of switches 212, 214, 216, 218, 220 to be in the blocked states or the unblocked states. A plurality of computer devices 302, 304, 306, 308, 310 are each connected to the plurality of logical nodes 202, 204, 206, 208, 210 and allow communication therebetween. A plurality of network interface units (NIUs) 312, 314, 316, 318, 320 are each connected to the plurality of computer devices 302, 304, 306, 308, 310 and allow communication therebetween. The plurality of NIUs 312, 314, 316, 318, 320 may be connected to a network.

Figure 4:
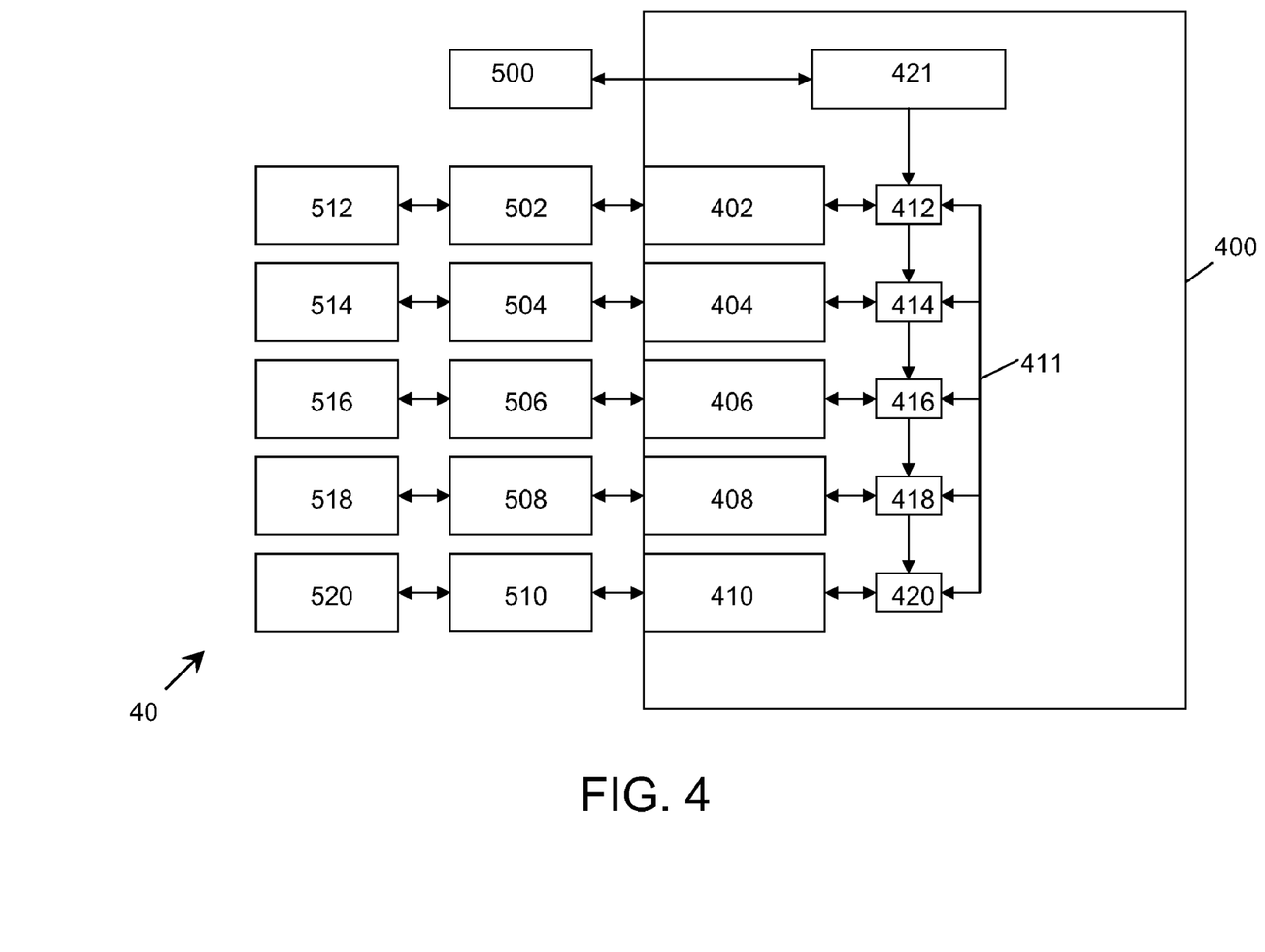
FIG. 4 shows a block diagram of a system according to an embodiment.

FIG. 4 shows another embodiment of a computer system 40 that includes a back panel 400. The back panel 400 has a plurality of logical nodes including a first logical node 402, a second logical node 404, a third logical node 406, a fourth logical node 408, and a fifth logical node 410. Although FIG. 4 shows five logical nodes, it is contemplated that a more or fewer number of logical nodes may be included in the computer system.

The back panel 400 also includes a back panel network 411. Associated with each of the plurality of logical nodes, a plurality of switches is configured on the back panel network 411 including a first switch 412, a second switch 414, a third switch 416, a fourth switch, 418, and a fifth switch 420. FIG. 4 shows five switches, but a more or fewer number of switches is possible. Each of the plurality of switches 412, 414, 416, 418, 420 has a blocked state and an unblocked state, wherein each of the plurality of switches 412, 414, 416, 418, 420 may individually be in one of the two states, wherein for each of the plurality of switches 412, 414, 416, 418, 420, being in a particular state is exclusive at any one time.

An I/O controller 421 controls the plurality of switches 412, 414, 416, 418, 420 to selectively and individually be in the blocked state or in the unblocked state. The I/O controller 421 is controlled by a TCM 500 that is external to the back panel 400. Thus, the TCM 500 may control the I/O controller 421 to control the plurality of switches 412, 414, 416, 418, 420 by receiving signals external to the computer system 40.

In the computer system 40, the switches 412, 414, 416, 418, 420 are configured on the back panel network 411 such that when the first switch 412 is in the blocked state, the first switch 412 blocks communication to/from the first logical node 402. When the first switch 402 is in the unblocked state, communication to/from the first logical node 402 is possible. Further, when the second switch 414 is in the blocked state, the second switch 414 blocks communication to/from the second logical node 404. When the second switch 414 is in the unblocked state, communication to/from the second logical node 404 is possible. Further, when the third switch 416 is in the blocked state, the third switch 416 blocks communication to/from the third logical node 406. When the third switch 416 is in the unblocked state, communication to/from the third logical node 406 is possible. Further, when the fourth switch 418 is in the blocked state, the fourth switch 418 blocks communication to/from the fourth logical node 408. When the fourth switch 418 is in the unblocked state, communication to/from the fourth logical node 408 is possible. Furthermore, when the fifth switch 420 is in the blocked state, the fifth switch 420 blocks communication to/from the fifth logical node 410. When the fifth switch 420 is in the unblocked state, communication to/from the fifth logical node 410 is possible.

A plurality of computer devices 502, 504, 506, 508, 510 are connected to the plurality of logical nodes 402, 404, 406, 408, 410 and allow communication therebetween. In addition, a plurality of network interface units (NIUs) 512, 514, 516, 518, 520 are connected to the plurality of computer devices 502, 504, 506, 508, 510 and allow communication therebetween. The plurality of NIUs 512, 514, 516, 518, 520 may be connected to a network.

Figure 5:
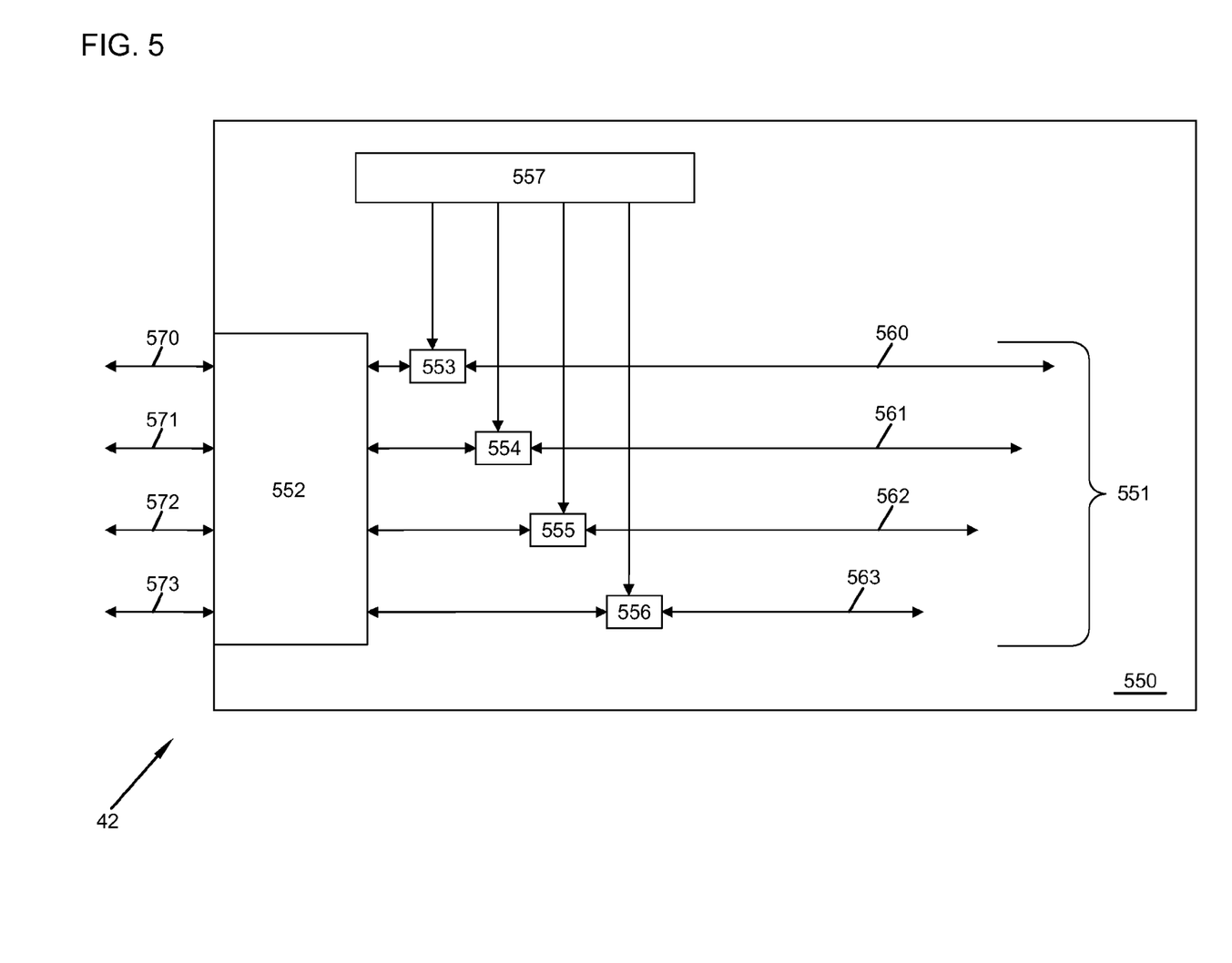
FIG. 5 shows a block diagram of a partial view of a back panel according to an embodiment.

FIG. 5 shows a partial view of a back panel 550 of an example of a node configuration 42, wherein only one logical node 552 is shown to illustrate an embodied configuration of a back panel network 551. The node configuration 42 may be included in any of the computer systems and/or methods described herein. The back panel network 551 includes a high speed interconnect connection 560, a discrete I/O connection 561, an Ethernet connection 562, and a power connection 563 for delivering power to the logical node. Each of the connections 560, 561, 562, 563 of the back panel network 551 has a separate switch configured thereon. A high speed interconnect switch 553 is configured on the high speed interconnect connection 560, a discrete I/O connect switch 554 is configured on the discrete I/O connection 561, an Ethernet connect switch 555 is configured on the Ethernet connection 562, and a power connect switch 556 is configured on the power connection 563. Each of the switches 553, 554, 555, 556 is controlled by an I/O controller 557. The switches may be selectively controlled individually and/or in combination and/or as a whole. Each switch has a blocked state and an unblocked state, wherein when in the blocked state, that switch disables communication along that particular connection of the back panel network 551 to/from the logical node 552. When the Ethernet connect switch 555 is in the blocked state, the logical node 552 would not receive or be allowed to send signals along the Ethernet connection 562 to/from the back panel network 551. When the discrete I/O connect switch 554 is in a blocked state, the logical node 552 would not receive or be allowed to send signals along the discrete I/O connection 561 to/from the back panel network 551. When the high speed interconnect switch 553 is in a blocked state, the logical node 552 would not receive or be allowed to send signals along the high speed interconnect connection 560 to/from the back panel network 551.

For example, when the Ethernet connect switch 555 is in the blocked state, the discrete I/O connect switch 554 is in a blocked state, the high speed interconnect switch 553 is in a blocked state, but the power connect switch 556 is not in a blocked state, the logical node 552 still receives power but is isolated from the connections 560, 561, 562 of the back panel network 551. Accordingly, the logical node 552 may be considered to be an isolated node.

When the power connect switch 556 is in a blocked state, the logical node 552 would not receive or provide power to/from the power connection 563 of the back panel network 551. Accordingly, when the power connect switch 556 is in a blocked state, the logical node 552 is disabled and may be considered to be a disabled node.

When the switches are in an unblocked state, signals would be allowed to be sent to/from the logical node 552. External to the back panel 550, the logical node would be connected to a device wherein the signals from the back panel network 551 would be communicated via various connections. FIG. 5 shows the logical node 552 communicating to a device external to the back panel 550 wherein there is a high speed interconnect connection 570, a discrete I/O connection 571, an Ethernet connection 572, and a power connection 573 for delivering power to an external device. The external device may be a computer device of a computer system that includes the node configuration 42 shown in FIG. 5.

For a system that has a plurality of logical nodes, it is envisioned that there would be a plurality of high speed interconnect connections that connects to at least one of the plurality of the logical nodes, a plurality of a discrete I/O connection that connects to at least one of the plurality of the logical nodes, a plurality of an Ethernet connection that connects to at least one of the plurality of the logical nodes, and a plurality of a power connection that delivers power to at least one of the plurality of logical nodes.

Figure 6:
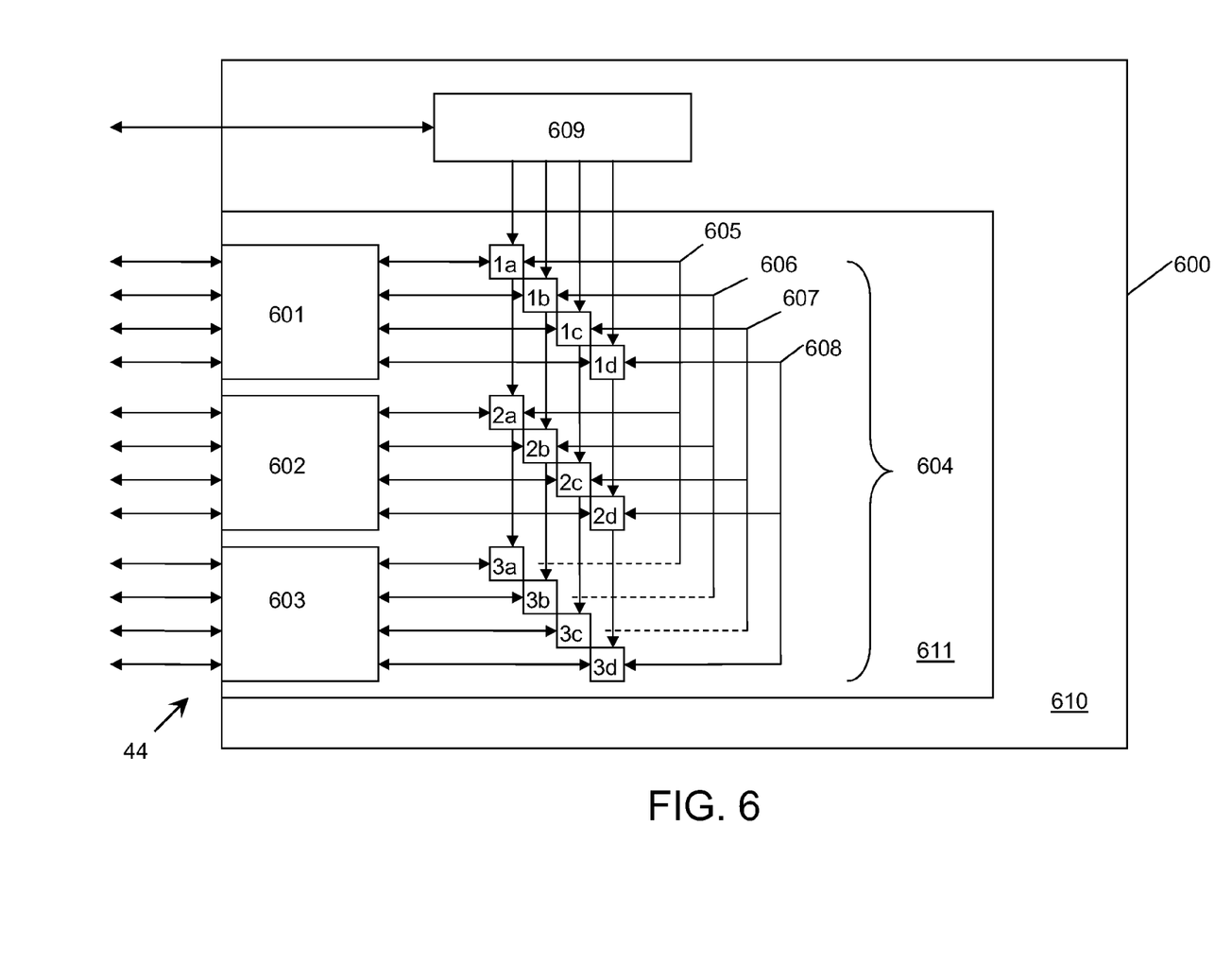
FIG. 6 shows a block diagram of a partial view of a back panel according to an embodiment.

An example of such a system is shown in FIG. 6 which is a partial view of a node configuration 44, wherein a back panel 600 has a plurality of logical nodes including a first logical node 601, a second logical node 602, and a third logical node 603. Each logical node, individually, has a similar node configuration to that shown with the node configuration 42 of FIG. 5, wherein each logical node is connected to a back panel network 604. The back panel network 604 includes a high speed interconnect connection 605, a discrete I/O connection 606, an Ethernet connection 607, and a power connection 608 for delivering power to the logical nodes. Each of the connections 605, 606, 607, 608 may be separate physical connections that interconnect the logical nodes 601, 602, 603.

A plurality of switches 1*a*, 1*b*, 1*c*, 1*d* are configured to block/unblock communication to/from the first logical node 601. The plurality of switches 1*a*, 1*b*, 1*c*, 1*d* are configured on the connections 605, 606, 607, 608 respectively. The switch 1*a* blocks/unblocks the high speed interconnect connection 605 to/from the first logical node 601. The switch 1*b* blocks/unblocks the discrete I/O connection 606 to/from the first logical node 601. The switch 1*c* blocks/unblocks the Ethernet connection 607 to/from the first logical node 601. The switch 1*d* blocks/unblocks the power connection 608 to/from the first logical node 601.

In addition, a plurality of switches 2*a*, 2*b*, 2*c*, 2*d* are configured to block/unblock communication to/from the second logical node 602. The plurality of switches 2*a*, 2*b*, 2*c*, 2*d* are configured on the connections 605, 606, 607, 608 respectively. The switch 2*a* blocks/unblocks the high speed interconnect connection 605 to/from the second logical node 602. The switch 2*b* blocks/unblocks the discrete I/O connection 606 to/from the second logical node 602. The switch 2*c* blocks/unblocks the Ethernet connection 607 to/from the second logical node 602. The switch 2*d* blocks/unblocks the power connection 608 to/from the second logical node 602.

Further, a plurality of switches 3*a*, 3*b*, 3*c*, 3*d* are configured to block/unblock communication to/from the third logical node 603. The plurality of switches 3*a*, 3*b*, 3*c*, 3*d* are configured on the connections 605, 606, 607, 608 respectively. The switch 3*a* blocks/unblocks the high speed interconnect connection 605 to/from the third logical node 603. The switch 3*b* blocks/unblocks the discrete I/O connection 606 to/from the third logical node 603. The switch 3*c* blocks/unblocks the Ethernet connection 607 to/from the third logical node 603. The switch 3*d* blocks/unblocks the power connection 608 to/from the third logical node 603.

An I/O controller 609 is also included in the back panel 600. The I/O controller 609 controls the plurality of switches 1*a*, 1*b*, 1*c*, 1*d*, 2*a*, 2*b*, 2*c*, 2*d*, 3*a*, 3*b*, 3*c*, 3*d* to be in the blocked states or unblocked states. The I/O controller 609 may be controlled by a device external to the back panel 600.

FIG. 6 shows an example of a particular situation when all of the switches 1*a*, 1*b*, 1*c*, 1*d* that control the communication to/from the first logical node 601 are in the unblocked states, and all of the switches 2*a*, 2*b*, 2*c*, 2*d* that control the communication to/from the second logical node 602 are in the unblocked states. FIG. 6 also shows the switch 3*d* in the unblocked state, and switches 3*a*, 3*b*, 3*c* in the blocked states. Accordingly, the third logical node 603, although it may be physically connected to at least a portion of the back panel network 604, at least up to the switches 3*a*, 3*b*, 3*c*, 3*d*, and the logical node 603 is still receiving power via the power connection 608, the third logical node 603 is selectively isolated from the rest of the logical nodes 601, 602 via the connections 605, 606, 607 of the back panel network 604. This isolation is indicated in FIG. 6 by dotted lines of the back panel network 604. However, the first and the second logical nodes 601, 602 are both physically connected and able to communicate to each other using all of the connections 605, 606, 607, 608 of the back panel network 604.

FIG. 6 also shows the back panel 600 including a protected back panel portion 610 and a non-protected back panel portion 611. The protected back panel portion 610 is a part of the trusted side of the computer system. The non-protected back panel portion 611 is a part of the un-trusted side of the computer system. As shown in FIG. 6, the logical nodes 601, 602, 603 are configured in the non-protected back panel portion 611. Also shown in FIG. 6, the I/O controller 609 is configured in the protected back panel portion 610. This configuration effectively surrounds the un-trusted side of the computer system with a trusted side protected back panel portion. External to the back panel, other devices may be used to complete the envelopment of the un-trusted side of the computer system with trusted computing components. Thus, this effectively and completely envelops un-trusted side with trusted side of the computer system to provide effective security without the need or cost involved with using only trusted computing devices to achieve similar functionality of a similar system.

Although only three logical nodes are shown in FIG. 6, it is envisioned that other embodiments may include a more or fewer number of logical nodes. The node configuration 44 exemplified in FIG. 6 may be included in any of the computer systems and/or methods described herein.

Figure 7:
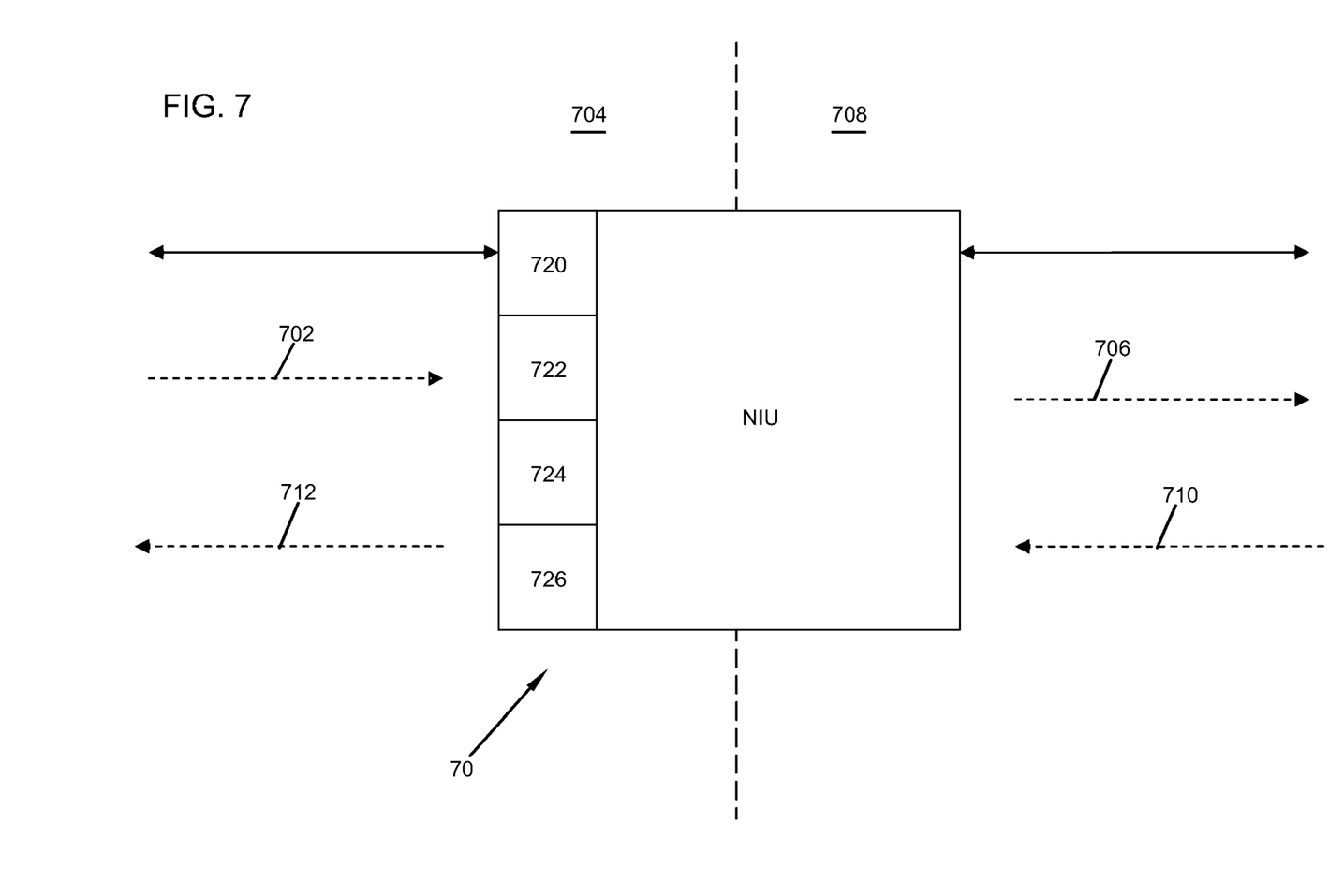
FIG. 7 shows a block diagram of a NIU according to an embodiment.

FIG. 7 shows a block diagram of an example of a NIU 70 that is configured to receive authentication information 702 from a trusted side 704. The example of the NIU 70 may also be configured to send authentication queries 706 to the un-trusted side 708. The example of the NIU 70 may also be configured to receive authentication responses 710 from the un-trusted side 708. The example of the NIU 70 may also send an authentication result 712 to the trusted side 704. FIG. 7 illustrates the NIU 70 as having an I/O component 720, an authenticator component 722, an encrypting/decrypting component 724, and a shared key component 726. The NIU exemplified in FIG. 7 may be included in any of the computer systems and/or methods described herein.

Figure 8:
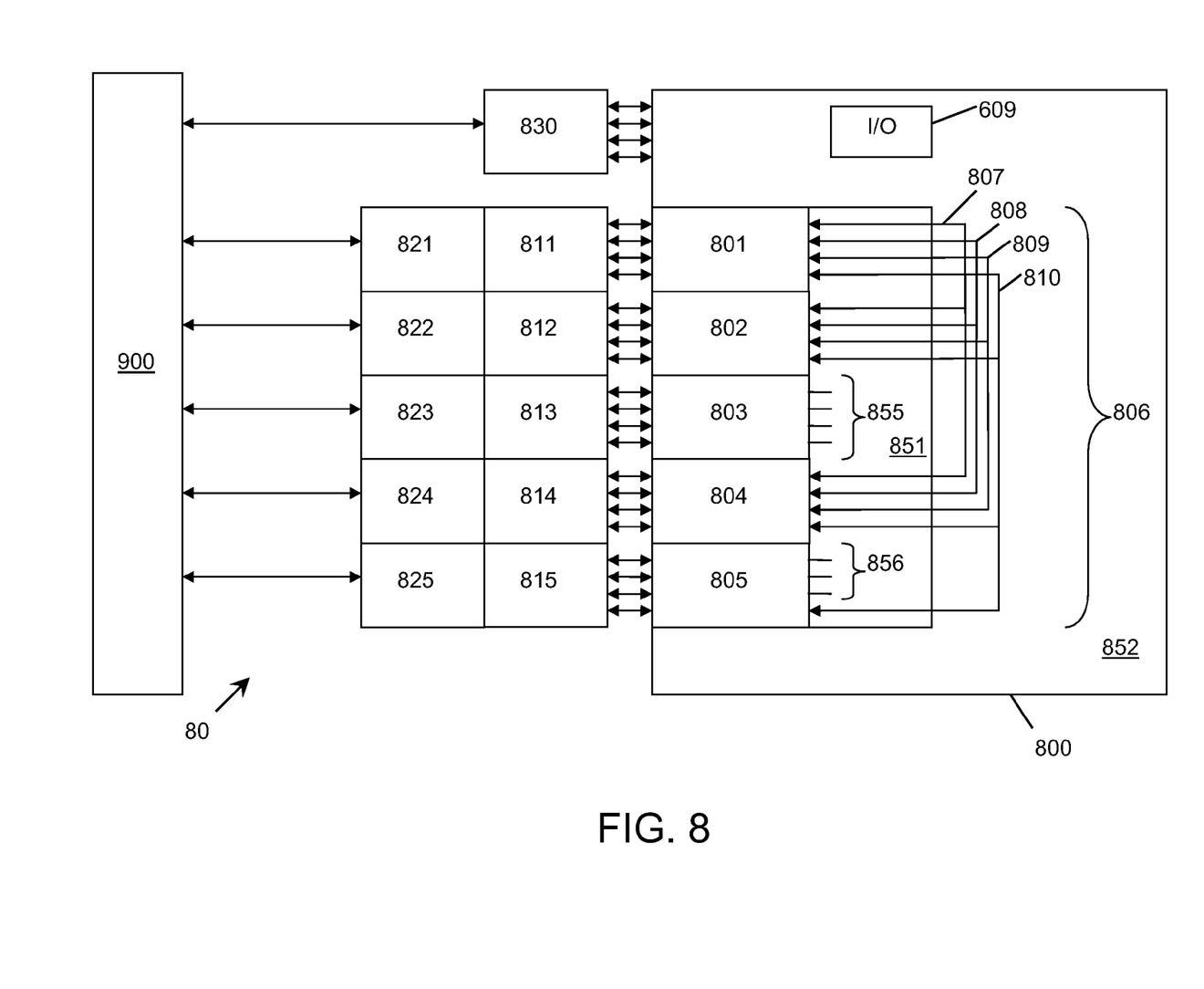
FIG. 8 shows a block diagram of a system according to an embodiment.

FIG. 8 shows a block diagram of another embodiment that includes a back panel 800. The back panel 800 has an unprotected back panel portion 851 and a protected back panel portion 852. In the unprotected back panel portion 851, there are a plurality of logical nodes 801, 802, 803, 804, 805 which are physically connected to each other via a back panel network 806. The back panel network 806 includes a plurality of connections, wherein the plurality of connections include a high speed interconnect connection, a discrete I/O connection, an Ethernet connection, and a power connection for delivering power to the logical nodes. Each of the connections may be separate physical connections that interconnect the logical nodes. The back panel network 806 is configured to block and/or unblock communication with each of the logical nodes 801, 802, 803, 804, 805. FIG. 8 shows an example of this configuration, wherein the logical nodes 801, 802, 804 that are unblocked are able to communicate with each other via the back panel network 806 along all connections 807, 808, 809, 810. A high speed interconnect connection 807, a discrete I/O connection 808, an Ethernet connection 809, and a power connection 810 are shown with connecting arrows to the unblocked logical nodes 801, 802, 804.

FIG. 8 also illustrates a disabled logical node 803. The logical node 803 is disabled because the power connection 810 has been blocked and/or disconnected to the logical node 803. In FIG. 8, the logical node 803 is shown with terminal lines 855 within the unprotected back panel portion 851 to indicate that the plurality of connections that include the high speed-interconnect connection, the discrete I/O connection, the Ethernet connection, and the power connection to the logical node 803 are not connected to the other connected logical nodes 801, 802, 804.

FIG. 8 also illustrates an isolated logical node 805. The isolated logical node 805 is shown with terminal lines 856 within the unprotected back panel portion 851 to indicate that one or more connections that include the high speed interconnect connection, the discrete I/O connection, and the Ethernet connection to and from the isolated logical node 805 is not connected to the other connected logical nodes 801, 802, 804. The isolated logical node 805 has a power connection 810. Accordingly, the logical node 805 is not disabled.

The terminal lines 855, 856 illustrated in FIG. 8 do not necessarily represent physical disconnection of the logical nodes 803, 805 to the rest of the devices in the back panel 800, although it is a possible and envisioned embodiment. The I/O controller 609 controls the switches as described in FIG. 6.

FIG. 8 also shows a plurality of computer devices 811, 812, 813, 814, 815. One or more of the computer devices 811, 812, 813, 814, 815 may be an unprotected computer device. FIG. 8 also shows a plurality of NIUs 821, 822, 823, 824, 825.

FIG. 8 shows the first NIU 821 connected to the first computer device 811, wherein the first computer device 811 is connected to the first logical node 801. The connection between the first computer device 811 and the first logical node 801 allows for connection that includes the high speed interconnect connection, the discrete I/O connection, the Ethernet connection, and the power connection, between the first computer device 811 to the back panel network 806. The first NIU 821 is connected to a network 900. The network 900 may be a trusted network. The first NIU 821 is configured to provide authentication. Authentication includes software authentication and/or hardware authentication. The first NIU 821 is configured to send queries to the first computer device 811 and receive authentication responses from the first computer device 811. Thus, the first NIU 821 provides security to and from the first computer device 811 to the network 900.

FIG. 8 also shows the second NIU 822 connected to the second computer device 812, wherein the second computer device 812 is connected to the second logical node 802. The connection between the second computer device 812 and the second logical node 802 allows for connection that includes the high speed interconnect connection, the discrete I/O connection, the Ethernet connection, and the power connection, between the second computer device 812 to the back panel network 806. The second NIU 822 is connected to a network 900. The network 900 may be a trusted network. The second NIU 822 is configured to provide authentication. Authentication includes software authentication and/or hardware authentication. The second NIU 822 is configured to send queries to the second computer device 812 and receive authentication responses from the second computer device 812. Thus, the second NIU 822 provides security to and from the second computer device 812 to the network 900.

FIG. 8 further shows the fourth NIU 824 connected to the fourth computer device 814, wherein the fourth computer device 814 is connected to the fourth logical node 804. The connection between the fourth computer device 814 and the fourth logical node 804 allows for connection that includes the high speed interconnect connection, the discrete I/O connection, the Ethernet connection, and the power connection, between the fourth computer device 814 to the back panel network 806. The fourth NIU 824 is connected to a network 900. The network 900 may be a trusted network. The fourth NIU 824 is configured to provide authentication. Authentication includes software authentication and/or hardware authentication. The fourth NIU 824 is configured to send queries to the fourth computer device 814 and receive authentication responses from the fourth computer device 814.

Thus, the fourth NIU 824 provides security to and from the fourth computer device 814 to the network 900.

Accordingly, the first computer device 811, the second computer device 812, and the fourth computer device 814 are shown to be in communication with each other via the back panel network 806. The data flowing between these computer devices 811, 812, 814 traverse through the trusted side and the un-trusted side of the computer system and/or network. An example of this situation would be when and if the computer devices 811, 812, 814 have passed the authentication measures and security provided by the plurality of NIUs 821, 822, 824 and the back panel 800.

A TCM 830 is also connected to the network 900 and to the protected back panel portion 852 of the back panel 800. The TCM 830 may control various functions and provide secure communication between the protected back panel portion 852 to and from the network 900. The TCM 830 may also control the blocking and/or unblocking of the logical nodes 801, 802, 803, 804, 805 by controlling portions of the back panel network 806.

FIG. 8 also shows the third and fifth NIUs 823, 825 that are each connected to the third and fifth computer devices 813, 815, respectively. The third computer device 813 is connected to the third logical node 803. The fifth computer device 815 is connected to the fifth logical node 805.

Although the connection between the computer device 813 and the logical node 803 would otherwise be capable of connections that include the high speed high speed interconnect connection, the discrete I/O connection, the Ethernet connection, and the power connection, between the computer device 813 to and from the back panel network 806, the third logical node 803 has been disabled. Thus, the third computer device 813 may not communicate with any other computer device via the back panel network 806. The third computer device 813 is connected to the NIU 823.

Further, although the connection between the computer device 815 and the logical node 805 would otherwise be capable of connections that include the high speed interconnect connection, the discrete I/O connection, and the Ethernet connection, between the computer device 815 to and from the back panel network 806, the fifth logical node 805 has been isolated. Thus, the fifth computer device 815 may not communicate with any other computer device via the high speed interconnect connection 807, the discrete I/O connection 808, and the Ethernet connection 809 of the back panel network 806. The power connection 810 to the fifth logical node 805 still provides power to the logical node 805. The fifth computer device 815 is connected to the NIU 825. Thus, the fifth computer device 815 may be able to communicate via the NIU 825 to the network 900. The fifth NIU 825 would provide security to and from the fifth computer device 815 to the network 900.

An example of when a logical node would be isolated is if the hardware connected to the logical node has not been properly authenticated and/or has failed the authentication. Thus, the isolated hardware is connectively removed from the rest of the computer system and network. This would provide security to a possible hardware and/or software that could damage or attack other parts of the computer system and/or network.

According to the embodiments herein, it is envisioned that a secure computer system is provided that includes only one TCM and a plurality of unprotected computer devices.

According to the embodiments herein, it is possible that a secure computer system may be built by providing a back panel that includes one or more logical nodes, providing a back panel network, wherein the back panel network includes a first switch. The embodied method includes connecting the I/O controller to the first switch, connecting the back panel network to the first logical node, connecting the back panel network to the second logical node, connecting a computer device to the first logical node, connecting a network interface unit (NIU) to the computer device and connecting the NIU to a network. It is not required that the above steps be followed sequentially as listed.

Preferred embodiments have been described. Those skilled in the art will appreciate that various modifications and substitutions are possible, without departing from the scope of the invention as claimed and disclosed, including the full scope of equivalents thereof.

What is claimed is:

1. A computer system, comprising:
   a back panel including a protected back panel portion and a non-protected back panel portion, including:
   a first logical node;
   a second logical node;
   a back panel network that connects the first logical node to the second logical node for communication, wherein the first and second logical nodes are in the non-protected back panel portion;
   a switch configured to the back panel network and associated with the first logical node, wherein the switch includes a blocked state for selectively isolating to block the first logical node from communicating with the back panel network, and an unblocked state for allowing the first logical node to be in communication with the back panel network; and
   an I/O controller that controls the switch to be in the blocked state or the unblocked state, wherein the I/O controller is in the protected back panel portion;
   a first computer device connected to the first logical node;
   a second computer device connected to the second logical node; and
   a network interface unit (NIU) connected to the first computer device and a trusted network, wherein when the switch is in the blocked state, the first computer device is not in direct communication with the trusted network, and the first computer device is configured to send data to the trusted network via the NIU and receive data from the trusted network via the NIU.

2. The computer system according to claim 1, further comprising a trusted computing module (TCM) that controls the I/O controller.

3. The computer system according to claim 2, wherein the NIU includes:
   an I/O component;
   an authenticator component;
   an encrypting/decrypting component; and
   a security component.

4. The computer system according to claim 1, wherein the NIU is configured to receive authentication information from the first computer device, receive an authentication response from the first computer device, send authentication queries to the first computer device, and send authentication results to the first computer device.

5. The computer system according to claim 1, wherein the first computer device is an unprotected computer device.

6. The computer system according to claim 1, wherein the back panel network includes:
   a high speed interconnect connection;
   a discrete I/O connection;
   an Ethernet connection; and
   a power connection.

7. A computer system, comprising:
a back panel including a protected back panel portion and a non-protected back panel portion, including:
   a plurality of logical nodes;
   a back panel network that connects at least one of the plurality of logical nodes to another logical node for communication, wherein the plurality of logical nodes are in the non-protected back panel portion;
   a plurality of switches configured to the back panel network, wherein each of the switches is associated with respective one of the logical nodes, and each of the switches includes a blocked state for selectively isolating to block the respective one of the logical nodes from communicating with the back panel network, and an unblocked state for allowing the respective one of the logical nodes to be in communication with the back panel network; and
   an I/O controller that controls each of the plurality of switches to be in the blocked state or the unblocked state, wherein the I/O controller is in the protected back panel portion;
a plurality of computer devices, each computer device is connected to a respective one of the logical nodes;
a plurality of network interface units (NIUs), each NIU is connected to a respective one of the computer devices; and
wherein each NIU is connected to a trusted network, wherein at least one of the plurality of computer devices connected to its respective logical node is not in direct communication with its respective trusted network when the switch associated with the same respective logical node is in the blocked state, and each of the plurality of computer devices is configured to send data to the trusted network via the respective NIU and receive data from the trusted network via the respective NIU.

8. The computer system according to claim 7, further comprising a trusted computing module (TCM) connected to the I/O controller that controls the I/O controller.

9. The computer system according to claim 8, wherein each of the plurality of NIUs includes:
   an I/O component;
   an authenticator component;
   an encrypting/decrypting component; and
   a security component.

10. The computer system according to claim 9, wherein each NIU is configured to receive authentication information from its respective connected computer device, receive an authentication response from its respective connected computer device, send authentication queries to its respective connected computer device, and send authentication results to its respective connected computer device.

11. The computer system according to claim 7, wherein at least one of the plurality of computer devices is an unprotected computer device.

12. The computer system according to claim 7, wherein the back panel network includes:
   a high speed interconnect connection;
   a discrete I/O connection;
   an Ethernet connection; and
   a power connection.

13. A method for building a computer system that is to be connected to a trusted network, comprising:
   configuring a back panel that includes a first logical node, a second logical node, an I/O controller, and a back panel network that includes a switch, wherein the back panel includes a protected back panel portion and a non-protected back panel portion, and wherein the first and second logical nodes are in the non-protected back panel portion and the I/O controller is in the protected back panel portion;
   configuring the I/O controller to control the switch, wherein the switch includes a blocked state for selectively isolating to block the first logical node from communicating with the back panel network, and an unblocked state for allowing the first logical node to be in communication with the back panel network;
   configuring the back panel network to be in communication with the first logical node and the second logical node;
   configuring a first computer device to be in communication with the first logical node;
   configuring a second computer device to be in communication with the second logical node;
   configuring a network interface unit (NIU) to be in communication with the first computer device and the trusted network, wherein the first computer device is configured to not be in direct communication with the trusted network when the switch is in the blocked state, and the first computer device is configured to send data to the trusted network via the NIU and receive data from the trusted network via the NIU.

14. The method according to claim 13, further comprising configuring a trusted computer module (TCM) to be in communication with the I/O controller.

15. The method according to claim 14, further comprising configuring the TCM to be in communication with the trusted network.

16. The method according to claim 14, wherein the TCM is connected to the trusted network, and, wherein selectively isolating the first logical node includes:
   sending a signal to the TCM from the trusted network for blocking the switch;
   sending a signal from the TCM to the I/O controller for blocking the switch; and
   sending a signal from the I/O controller to the switch that blocks the switch.

17. A method for selectively isolating a first node connected to a back panel network of the computer system according to claim 2, the method comprising:
   sending a signal from the TCM to the I/O controller for blocking the switch; and
   sending a signal from the I/O controller to the switch that blocks the switch for selectively isolating the first node from communicating with the back panel network.

* * * * *